(12) United States Patent
Tung et al.

(10) Patent No.: US 11,945,206 B2
(45) Date of Patent: Apr. 2, 2024

(54) DISPLAY DEVICE

(71) Applicant: AUO Display Plus Corporation, Hsinchu (TW)

(72) Inventors: Hsin-Wen Tung, Hsinchu (TW); Hui-Lung Lu, Hsinchu (TW)

(73) Assignee: AUO Display Plus Corporation, Hsinchu (TW)

( * ) Notice: Subject to any disclaimer, the term of this patent is extended or adjusted under 35 U.S.C. 154(b) by 0 days.

(21) Appl. No.: 18/215,843

(22) Filed: Jun. 29, 2023

(65) Prior Publication Data

US 2023/0339208 A1   Oct. 26, 2023

(30) Foreign Application Priority Data

Apr. 13, 2023   (TW) .................. 112113924

(51) Int. Cl.
 *B32B 7/10*   (2006.01)
 *B32B 3/08*   (2006.01)
 *B32B 7/14*   (2006.01)
 *B32B 17/10*  (2006.01)
(52) U.S. Cl.
 CPC .................. *B32B 7/14* (2013.01); *B32B 3/08* (2013.01); *B32B 17/10* (2013.01); *B32B 2457/208* (2013.01)
(58) Field of Classification Search
 CPC .. B32B 7/14; B32B 3/08; B32B 17/10; B32B 2457/208
 USPC ............................................. 428/192
 See application file for complete search history.

(56) References Cited

U.S. PATENT DOCUMENTS

| | | | |
|---|---|---|---|
| 2015/0212350 A1* | 7/2015 | Niiyama | B32B 37/0076 349/122 |
| 2016/0361907 A1 | 12/2016 | Luo et al. | |
| 2020/0349336 A1* | 11/2020 | Lius | G06F 3/0412 |
| 2023/0339208 A1* | 10/2023 | Tung | B32B 17/10 |

FOREIGN PATENT DOCUMENTS

| | | |
|---|---|---|
| CN | 208013611 U | 10/2018 |
| TW | I494808 B | 8/2015 |
| TW | 202022450 A | 6/2020 |

OTHER PUBLICATIONS

CN-104309267-A, Machine translation. (Year: 2015).*

* cited by examiner

*Primary Examiner* — Betelhem Shewareged (57) ABSTRACT

A display device includes a first substrate, a second substrate, an adhesive body and a limiting adhesive tape. The second substrate is disposed to be opposite to the first substrate. The adhesive body is connected to the first substrate and the second substrate. The limiting adhesive tape is disposed on the first substrate and/or the second substrate, and the limiting adhesive tape is covered by the adhesive body.

14 Claims, 10 Drawing Sheets

DISPLAY DEVICE

FIELD OF THE INVENTION

The present disclosure relates to an electronic device, and in particular to a display device.

BACKGROUND OF THE INVENTION

In a process of assembling a display device, an adhesive is often used to bond two substrates. Generally speaking, the way to bond two substrates may include air bonding (A/B) and direct bonding (D/B). After the air bonding or direct bonding is completed, reinforcing glue is usually used to coat the edges of the two substrates to increase the bonding firmness of the two substrates.

Figure 1:
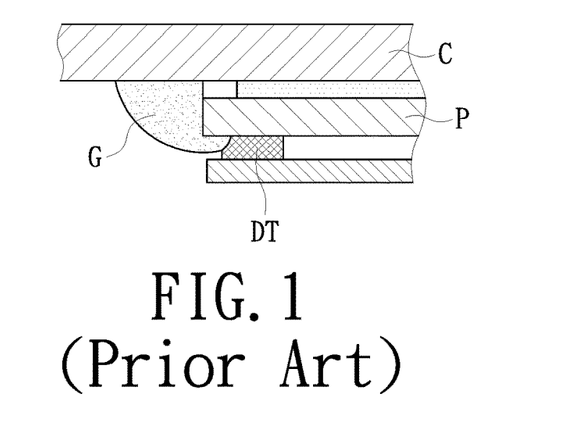
FIG. 1 is a partial cross-sectional schematic diagram of a display device in prior art.

However, because a coating volume of the reinforcing glue is difficult to control, it often causes the problem of excessive disposing range of the reinforcing glue, thereby affecting the space for assembling other components. For example, with reference to FIG. 1, the reinforcing glue G may be coated at an edge of a substrate P and a cover plate C; however, because the coating range of the reinforcing glue G is not easy to control, it causes the reinforcing glue G to be prone to extend to the substrate P. In addition, because a double-sided adhesive DT is usually required to be disposed on the substrate P, the reinforcing glue G extending to the substrate P not only affects the space for attaching the double-sided adhesive DT, but also affects the space for assembling other components.

SUMMARY OF THE INVENTION

The present disclosure provides a display device, which has the advantage of a moderate area of disposing an adhesive body.

The display device provided by the present disclosure includes a first substrate, a second substrate, an adhesive body and a limiting adhesive tape. The second substrate is disposed to be opposite to the first substrate. The adhesive body is connected to the first substrate and the second substrate. The limiting adhesive tape is disposed on the first substrate and/or the second substrate, and the limiting adhesive tape is covered by the adhesive body.

In an embodiment of the present disclosure, the first substrate may have a first surface, and the first surface faces away from the second substrate. The limiting adhesive tape is disposed on the first surface.

In an embodiment of the present disclosure, the first substrate may further have a first side surface, and the first side surface is connected to the first surface. The limiting adhesive tape extends from the first surface to the first side surface, and the adhesive body extends from the first surface to the first side surface and the second substrate.

In an embodiment of the present disclosure, the first substrate may further have a first side surface, and the first side surface is connected to the first surface. The limiting adhesive tape has a main body portion and a positioning portion. The main body portion is located on the first surface. The positioning portion is connected to the main body portion and extends to the first side surface.

In an embodiment of the present disclosure, the positioning portion further extends to, for example, the second substrate.

In an embodiment of the present disclosure, the positioning portion may include a first segment and a second segment. The main body portion extends along an edge of the first surface. The first segment and the second segment are connected to two opposite sides of the main body portion and respectively extend to the first side surface.

In an embodiment of the present disclosure, the first segment and/or the second segment extend to, for example, the second substrate.

In an embodiment of the present disclosure, the first substrate may have a first surface and a first side surface. The first surface faces away from the second substrate, and the first side surface is connected to the first surface. The limiting adhesive tape is disposed on the first side surface, and the adhesive body extends from the first side surface to the second substrate.

In an embodiment of the present disclosure, the second substrate has, for example, a second surface, and the second surface faces the first substrate. The limiting adhesive tape is disposed on the second surface, and the adhesive body extends from the second surface to the first substrate.

In an embodiment of the present disclosure, the second surface has, for example, a central area and a peripheral area. The central area is opposite to the first substrate, and the central area is surrounded by the peripheral area. The limiting adhesive tape is disposed in the peripheral area.

In an embodiment of the present disclosure, the limiting adhesive tape may have a main body portion and a positioning portion. The main body portion is located on the second surface. The positioning portion is connected to the main body portion and extends to the first substrate.

In an embodiment of the present disclosure, the positioning portion includes, for example, a first segment and a second segment. The first segment and the second segment are connected to two opposite sides of the main body portion and respectively extend to the first substrate.

In an embodiment of the present disclosure, the limiting adhesive tape may have a first part and a second part. The first substrate has a first surface, and the first surface faces away from the second substrate. The second substrate has a second surface, and the second surface faces the first substrate. The first part is disposed on the first surface, and the second part is disposed on the second surface. The adhesive body extends from the first surface to the second surface.

In an embodiment of the present disclosure, the first substrate further has, for example, a first side surface, and the first side surface is connected to the first surface. The first part extends from the first surface to the first side surface, and the adhesive body extends from the first surface and the first side surface to the second surface.

In an embodiment of the present disclosure, the display device further includes, for example, an adhesive layer, and the adhesive layer is sandwiched between the first substrate and the second substrate. The adhesive body extends from an edge of the first substrate to the second substrate.

In a process of assembling the display device of the present disclosure, a limiting adhesive tape is first disposed at a preset position; and the adhesive body is coated, and then the limiting adhesive tape is removed, at the same time, the adhesive body attached to the limiting adhesive tape is removed together with the limiting adhesive tape. In this way, a part of the limiting adhesive tape still remains on the first substrate and/or the second substrate, and the remained limiting adhesive tape is covered by the adhesive body. Based on the description above, the adhesive body of the display device of the present disclosure is only coated with the preset region which has a moderate disposing area, so that no adhesive body overflows to affect a disposing space of other components.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2:
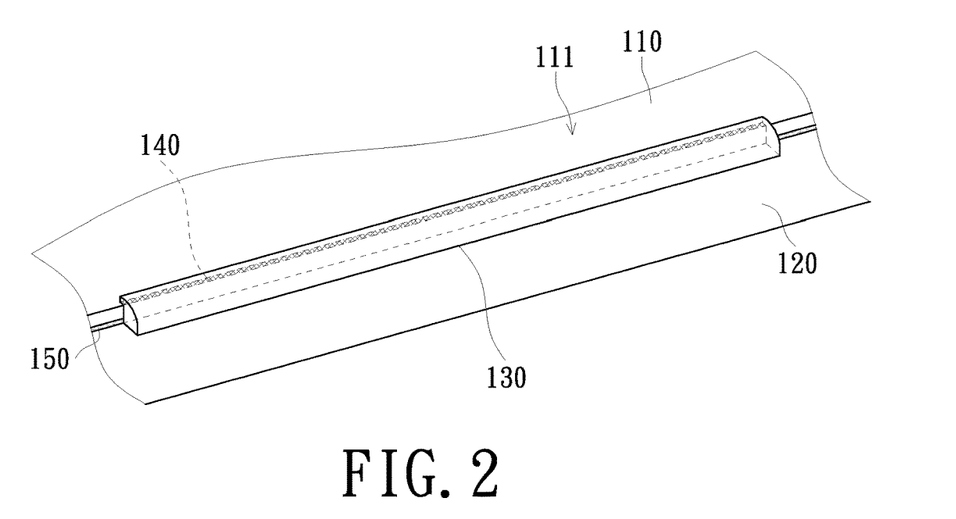
FIG. 2 is a partial 3D schematic diagram of a display device according to an embodiment of the present disclosure.
Figure 3:
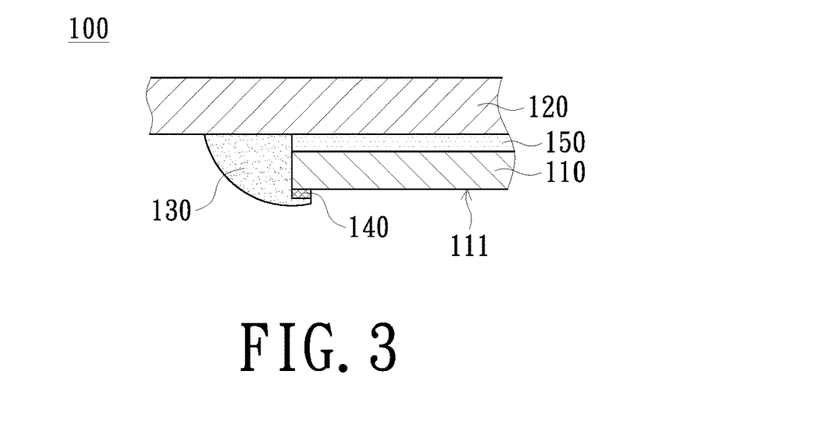
FIG. 3 is a partial cross-sectional schematic diagram of the display device in FIG. 2.
Figure 4:
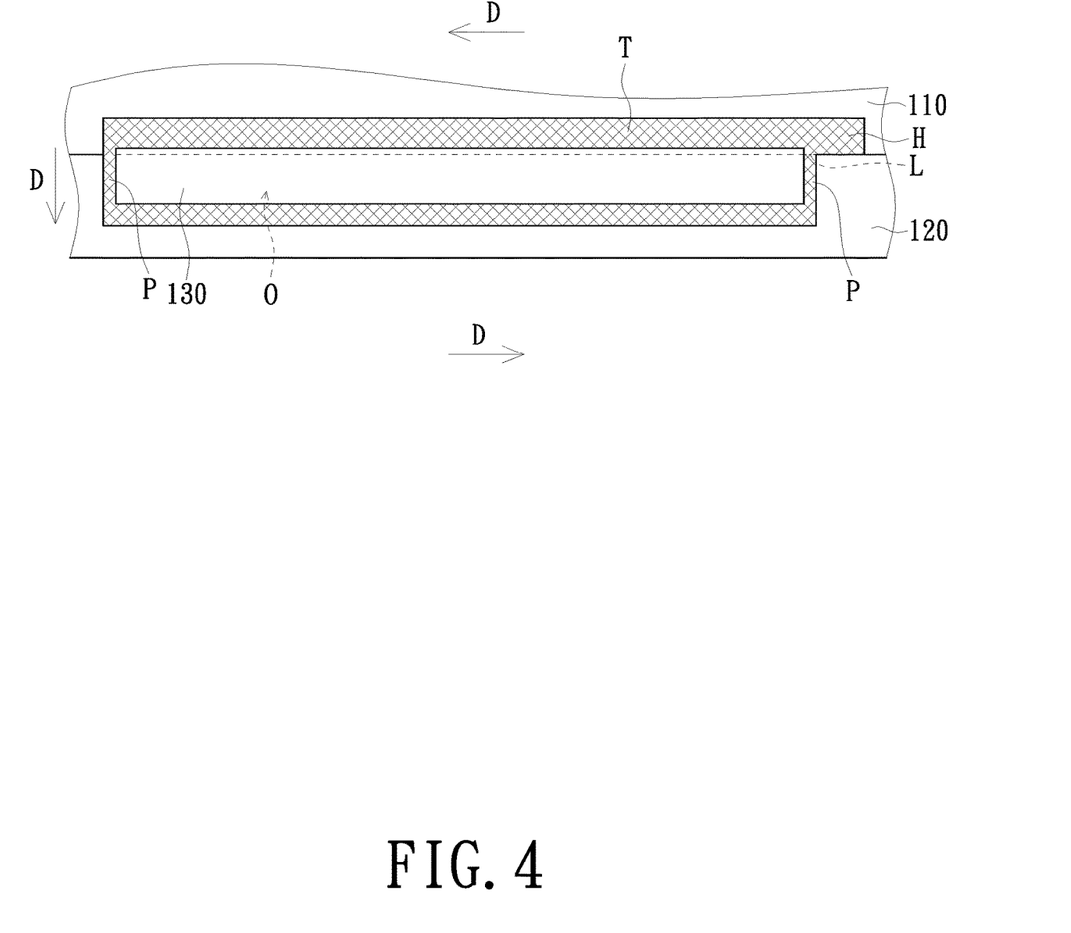
FIG. 4 is a partial schematic top diagram of the display device in FIG. 2 without removing a limiting adhesive tape.
Figure 5:
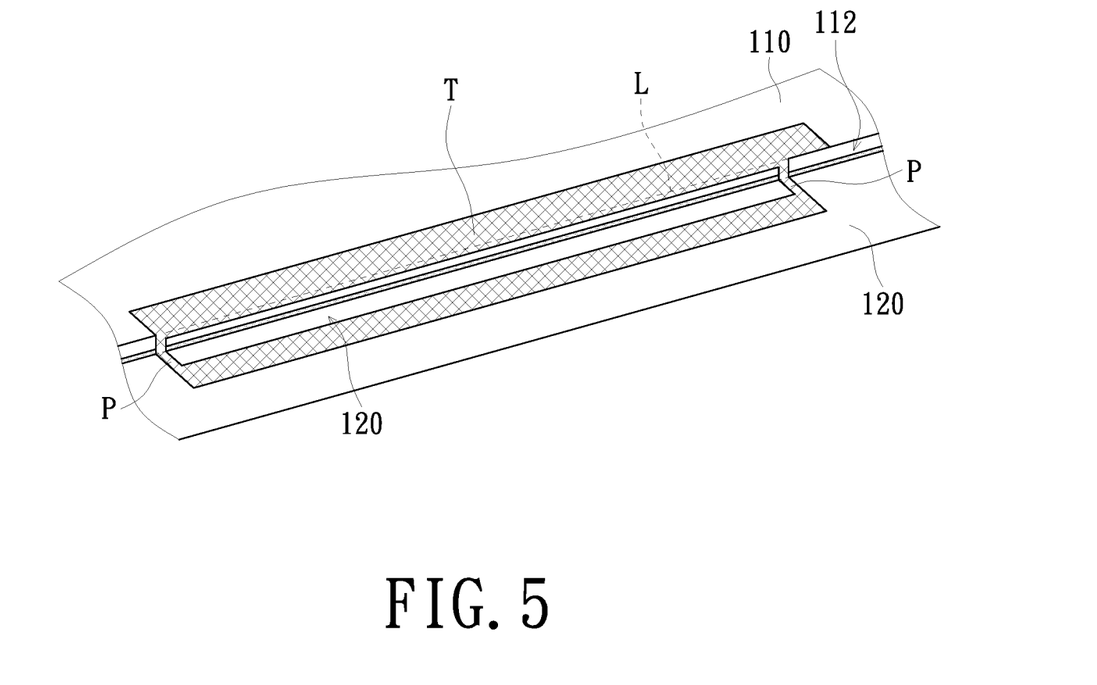
FIG. 5 is a partial 3D schematic diagram of the display device in FIG. 2 without removing the limiting adhesive tape.
Figure 6:
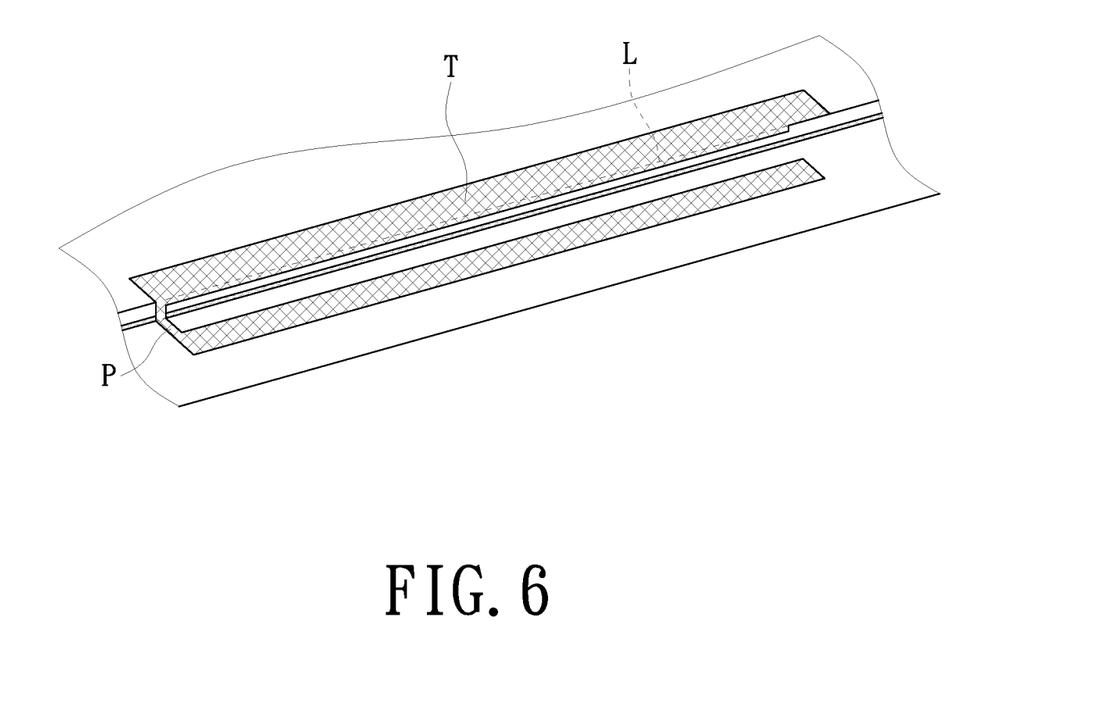
FIG. 6 is a partial 3D schematic diagram of a display device without removing a limiting adhesive tape, according to another embodiment of the present disclosure.
Figure 7:
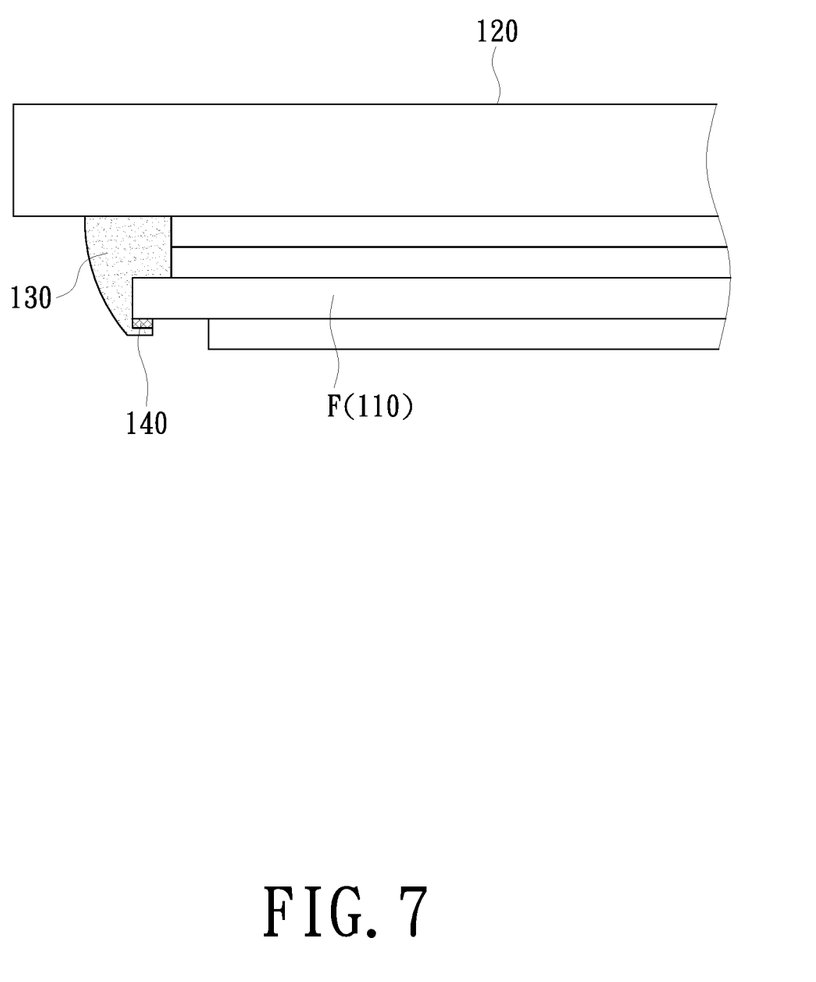
FIG. 7 is a partial cross-sectional schematic diagram of a display device according to another embodiment of the present disclosure.

FIG. 2 is a partial 3D schematic diagram of a display device according to an embodiment of the present disclosure. FIG. 3 is a partial cross-sectional schematic diagram of the display device in FIG. 2. FIG. 4 is a partial schematic top diagram of the display device in FIG. 2 without removing a limiting adhesive tape. FIG. 5 is a partial 3D schematic diagram of the display device in FIG. 2 without removing the limiting adhesive tape. FIG. 6 is a partial 3D schematic diagram of a display device without removing a limiting adhesive tape according to another embodiment of the present disclosure. FIG. 7 is a partial cross-sectional schematic diagram of a display device according to another embodiment of the present disclosure.

With reference to FIG. 2 and FIG. 3, the display device 100 includes a first substrate 110, a second substrate 120, an adhesive body 130 and a limiting adhesive tape 140. The second substrate 120 is disposed to be opposite to the first substrate 110. The adhesive body 130 is connected to the first substrate 110 and the second substrate 120. The limiting adhesive tape 140 is disposed on the first substrate 110 and/or the second substrate 120, and the limiting adhesive tape 140 is disposed on the first substrate 110 as an example in this embodiment. The limiting adhesive tape 140 is covered by the adhesive body 130.

With reference to FIG. 2 and FIG. 4 together, after a process of removing the limiting adhesive tape T is completed, a part of the limiting adhesive tape T still covered by the adhesive body 130 is not removed, thereby forming the limiting adhesive tape 140 shown in FIG. 2. In detail, with reference to FIG. 4 and FIG. 5, the limiting adhesive tape T may have an opening O, and a position of the opening O is corresponding to a region of the first substrate 110 and/or the second substrate 120 where the adhesive body 130 is to be disposed. For example, in this embodiment, most of the adhesive body 130 is to be disposed on the second substrate 120, so the opening O is roughly overlapped with the second substrate 120. In addition, the limiting adhesive tape T may further have at least one positioning portion P to more accurately show the region where the adhesive body 130 is to be disposed. For example, two positioning portions P in opposite positions are taken as an example in the embodiment in FIG. 5, and one positioning portion P is taken as an example in the embodiment in FIG. 6. It can be understood that the number and the positions of the positioning portions P may be changed according to a region where the adhesive body 130 is to be disposed, so the present disclosure is not limited thereto. With reference to FIG. 4 again, before the adhesive body 130 is disposed, the limiting adhesive tape T may be fixed to the first substrate 110 and the second substrate 120, and the opening O is aligned with the region on the first substrate 110 and the second substrate 120 where the adhesive body 130 is to be disposed. After the limiting adhesive tape T is fixed to the first substrate 110 and the second substrate 120, the adhesive body 130 is disposed on the first substrate 110 and the second substrate 120 through the opening O, and then the limiting adhesive tape T is removed (preferably before the adhesive body 130 is solidified). After the limiting adhesive tape T is removed, a part of the limiting adhesive tape T is covered by the adhesive body 130 and is remained on the first substrate 110, thus forming the situations shown in FIG. 2 and FIG. 3. That is, the adhesive body 130 is connected to the first substrate 110 and the second substrate 120, the limiting adhesive tape 140 is covered by a part of the adhesive body 130, and the limiting adhesive tape 140 is located between the adhesive body 130 and the first substrate 110 in FIG. 2. With continued reference to FIG. 4, in this embodiment, the limiting adhesive tape T further has, for example, a seam structure L to be torn along a direction D. Furthermore, the limiting adhesive tape T may further have a grasping portion H to be grasped and torn along the direction D. However, the way of removing the limiting adhesive tape T is not limited in the present disclosure.

With reference to FIG. 2 and FIG. 3 again, in this embodiment, the display device 100 is, for example, a touch display device, the first substrate 110 may include a touch sensor glass of the touch display device, and the second substrate 120 may be a cover lens. However, in an embodiment, for example, as shown in FIG. 7, the first substrate 110 may include an optical film F, and the optical film F includes, for example, a prism sheet, a light filter, etc., and the present disclosure is not limited thereto. With reference to FIG. 2 and FIG. 3 again, in this embodiment, the first substrate 110 may have a first surface 111, and the first surface 111 faces away from the second substrate 120. The limiting adhesive tape 140 is located on the first surface 111. Specifically, with reference to FIG. 3 and FIG. 4 together, before the adhesive body 130 is solidified, the adhesive body 130 extends from the second substrate 120 to the first surface 111 of the first substrate 110, and a part of the limiting adhesive tape T located on the first surface 111 is covered by the adhesive body 130. Therefore, after most of the limiting adhesive tape T is removed, the part of the limiting adhesive tape T covered by the adhesive body 130 still remains on the first surface 111. However, according to the factors such as the region of disposing the adhesive body 130 and a shape of the limiting adhesive tape T, etc., the position and shape of the limiting adhesive tape 140 may be different from those shown in this embodiment, which is further described in the following paragraphs.

With continued reference to FIG. 3, the adhesive body 130 in this embodiment may include optical clear resin (OCR) or super view resin (SVR), but the present disclosure is not limited thereto. Incidentally, the display device 100 in this embodiment further includes, for example, an adhesive layer 150, and the adhesive layer 150 is sandwiched between the first substrate 110 and the second substrate 120. The adhesive body 130 extends from an edge of the first substrate 110 to the second substrate 120. In detail, the adhesive layer 150 fixes the first substrate 110 and the second substrate 120 via air bonding or direct bonding. On the other hand, the adhesive body 130 may be disposed at the edge of the first substrate 110 and extend to the second substrate 120, so as to further fix the first substrate 110 and the second substrate 120. The adhesive layer 150 includes, for example, optical clear resin (OCR) or super view resin (SVR), but the present disclosure is not limited thereto.

Compared with the prior art, a process of assembling the display device 100 in this embodiment includes: disposing the limiting adhesive tape T at a preset position; coating the adhesive body 130 and then removing the limiting adhesive tape T, wherein at the same time, the adhesive body 130 attached to the limiting adhesive tape T is removed together with the limiting adhesive tape T. In this way, a part of the limiting adhesive tape T (that is, the limiting adhesive tape 140 in FIG. 2 and FIG. 3) covered by the adhesive body 130 still remains on the first substrate 110 and/or the second substrate 120. Based on the description above, the adhesive body 130 of the display device 100 in this embodiment is only coated at the preset region which has a moderate area, so that no adhesive body overflows to affect a disposing space of other components.

Figure 8:
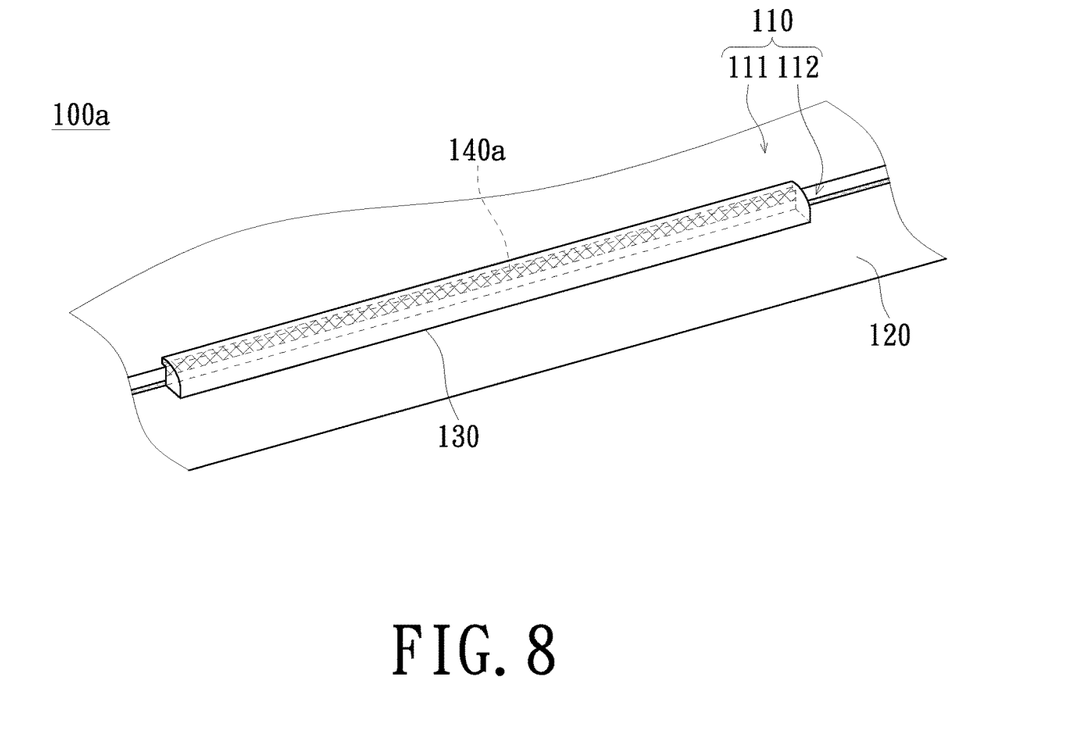
FIG. 8 is a partial 3D schematic diagram of a display device according to another embodiment of the present disclosure.
Figure 9:
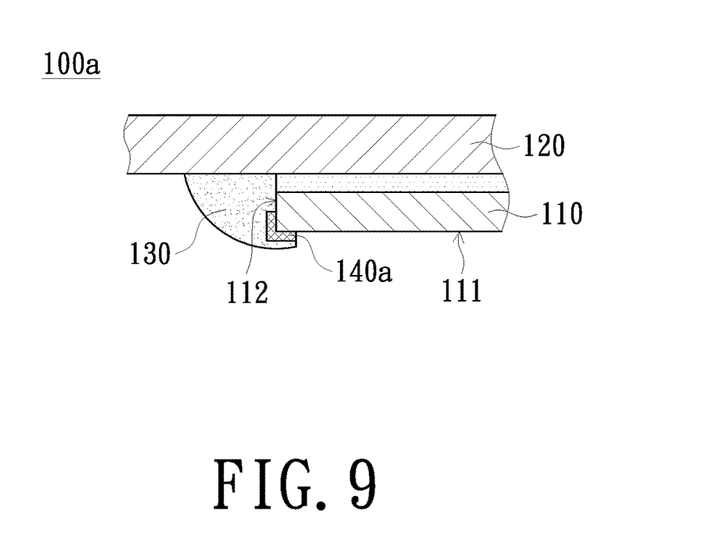
FIG. 9 is a partial cross-sectional schematic diagram of the display device in FIG. 8.

FIG. 8 is a partial 3D schematic diagram of a display device according to another embodiment of the present disclosure. FIG. 9 is a partial cross-sectional schematic diagram of the display device in FIG. 8. The structure and advantages of the display device 100a in this embodiment are similar to those of the embodiment in FIG. 2, and only the differences are described below. With reference to FIG. 8 and FIG. 9, the first substrate 110 may further have a first side surface 112, and the first side surface 112 is connected to the first surface 111. The limiting adhesive tape 140a extends from the first surface 111 to the first side surface 112, and the adhesive body 130 extends from the first surface 111 to the first side surface 112 and the second substrate 120. In detail, before a process of removing the limiting adhesive tape is performed, a part of the limiting adhesive tape extends from the first surface 111 to the first side surface 112, and the limiting adhesive tape is covered by the adhesive body 130, so a part of the limiting adhesive tape still remains on the first surface 111 and the first side surface 112 after most of the limiting adhesive tape is removed, and the limiting adhesive tape 140a shown in FIG. 8 and FIG. 9 is formed.

Figure 10:
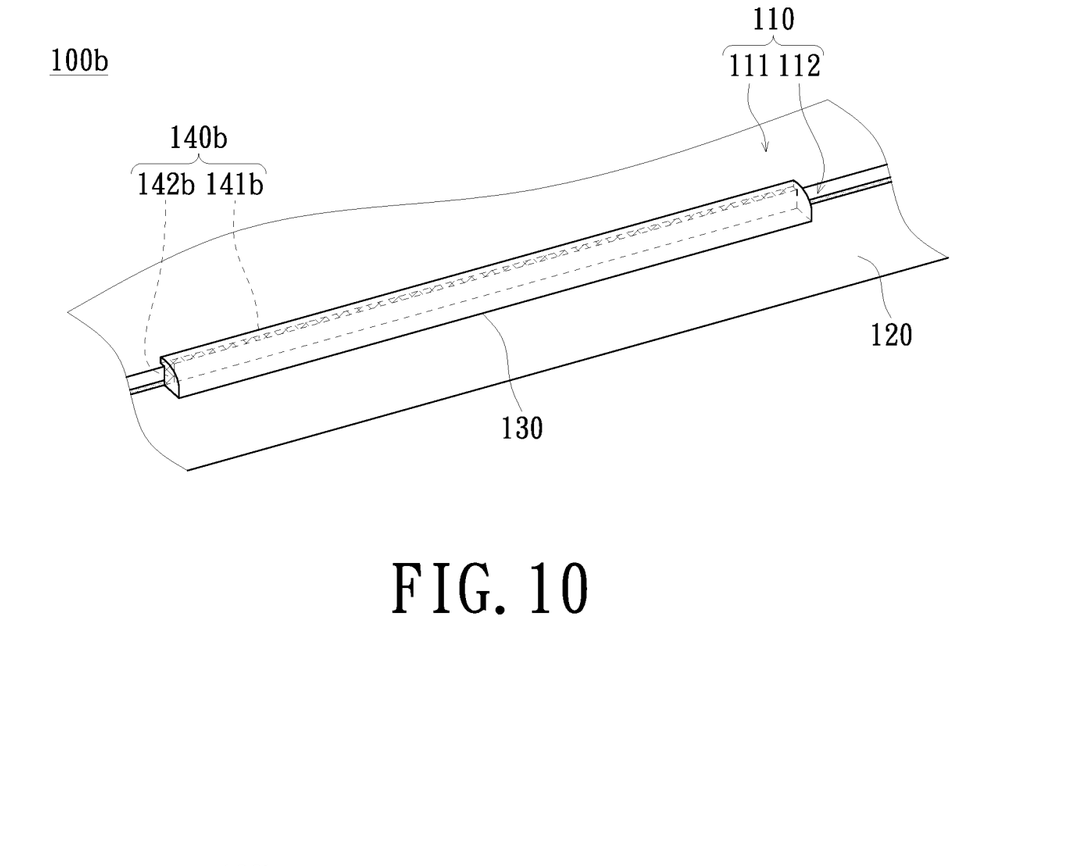
FIG. 10 is a partial 3D schematic diagram of a display device according to another embodiment of the present disclosure.
Figure 11:
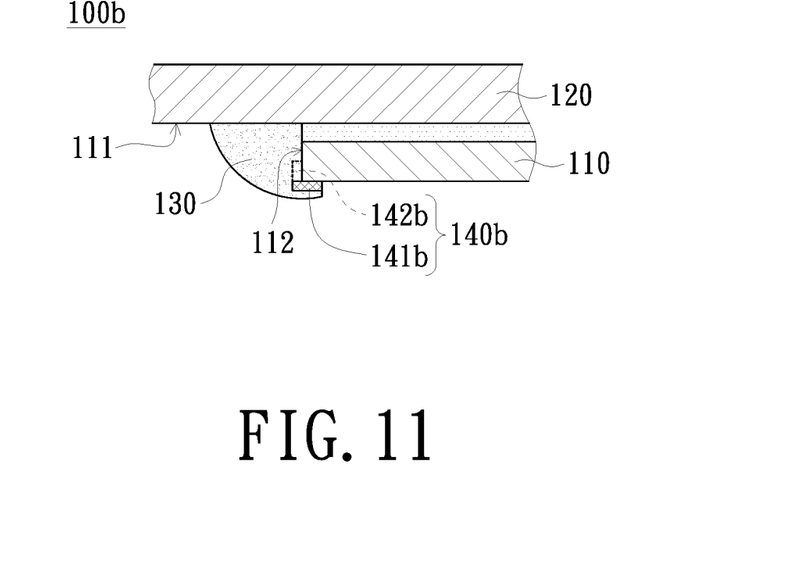
FIG. 11 is a partial cross-sectional schematic diagram of the display device in FIG. 10.
Figure 12:
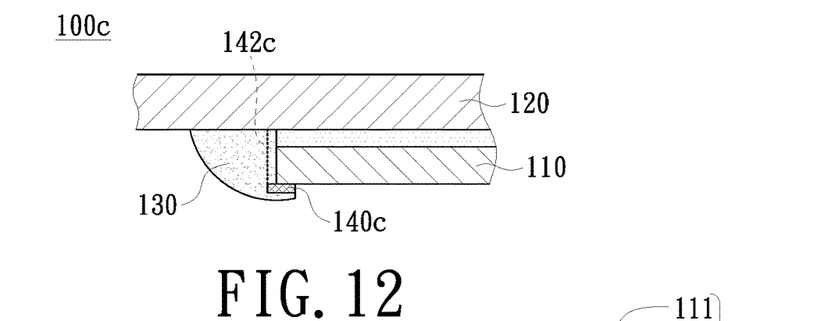
FIG. 12 is a partial cross-sectional schematic diagram of a display device according to another embodiment of the present disclosure.

FIG. 10 is a partial 3D schematic diagram of a display device according to another embodiment of the present disclosure. FIG. 11 is a partial cross-sectional schematic diagram of the display device in FIG. 10. The structure and advantages of the display device 100b in this embodiment are similar to those of the embodiment in FIG. 2, and only the differences are described below. With reference to FIG. 10 and FIG. 11, the limiting adhesive tape 140b may have a main body portion 141b and a positioning portion 142b. The main body portion 141b is located on the first surface 111. The positioning portion 142b is connected to the main body portion 141b and extends to the first side surface 112. For example, the positioning portion 142b is formed by, for example, one of the positioning portions P in FIG. 5 being covered by the adhesive body 130, or the positioning portion P in FIG. 6 being covered by the adhesive body 130. Incidentally, the function of the positioning portion 142b is basically the same as the function of the positioning portions P in FIG. 5 and FIG. 6, so no redundant detail is to be given herein. With reference to FIG. 10 and FIG. 11 again, it is to be noted that although the main body portion 141b in this embodiment is shown as being disposed on the first surface 111, the main body portion 141b may extend from the first surface 111 to the first side surface 112 in an embodiment. In the same way, the main body portion 141b may be disposed on the first side surface 112 in another embodiment, and the specific position of the main body portion 141b is not limited by the present disclosure. It can be understood that the position of the positioning portion 142b is not limited to those shown in FIG. 10 and FIG. 11. For example, with reference to the display device 100c in FIG. 12, the positioning portion 142c of the limiting adhesive tape 140c further extends to, for example, the second substrate 120, so as to more accurately control the disposing region of the adhesive body 130.

Figure 13:
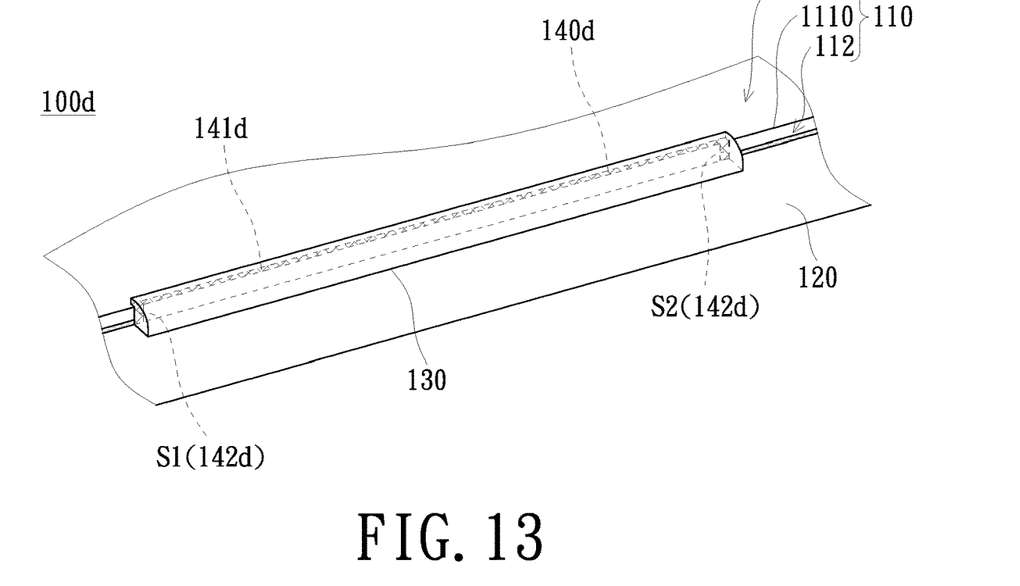
FIG. 13 is a partial 3D schematic diagram of a display device according to another embodiment of the present disclosure.
Figure 14:
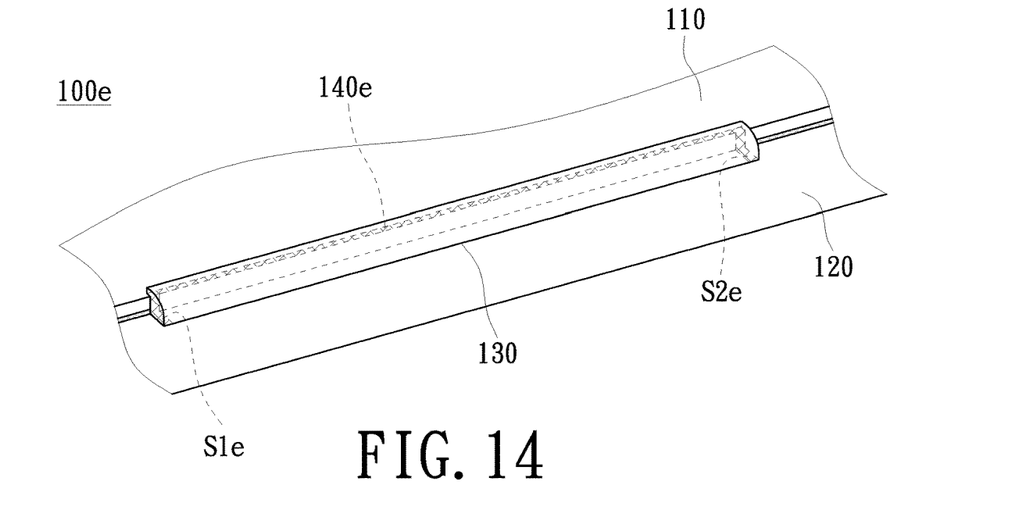
FIG. 14 is a partial 3D schematic diagram of a display device according to another embodiment of the present disclosure.

FIG. 13 is a partial 3D schematic diagram of a display device according to another embodiment of the present disclosure. FIG. 14 is a partial 3D schematic diagram of a display device according to another embodiment of the present disclosure. The structure and advantages of the display device 100d in this embodiment are similar to those of the embodiment in FIG. 10, and only the differences are described below. With reference to FIG. 13 first, the positioning portion 142d of the limiting adhesive tape 140d may include a first segment S1 and a second segment S2, so as to more accurately control the disposing region of the adhesive body 130. The main body portion 141d extends along an edge 1110 of the first surface 111. The first segment S1 and the second segment S2 are connected to the two opposite sides of the main body portion 141d respectively and extend to the first side surface 112. In detail, the first segment S1 and the second segment S2 are formed by, for example, the two positioning portions P in FIG. 5 being covered by the adhesive body 130, but the present disclosure is not limited thereto. In the same way, the specific position of the main body portion 141d is not limited by the present disclosure. With reference to the display device 100e shown in FIG. 14, similarly, the first segment S1e and/or the second segment S2e of the limiting adhesive tape 140e further extend to the second substrate 120, and in FIG. 14, both of the first segment S1e and the second segment S2e extending to the second substrate 120 is taken as an example. In this way, the disposing region of the adhesive body 130 may be further accurately controlled.

Figure 15:
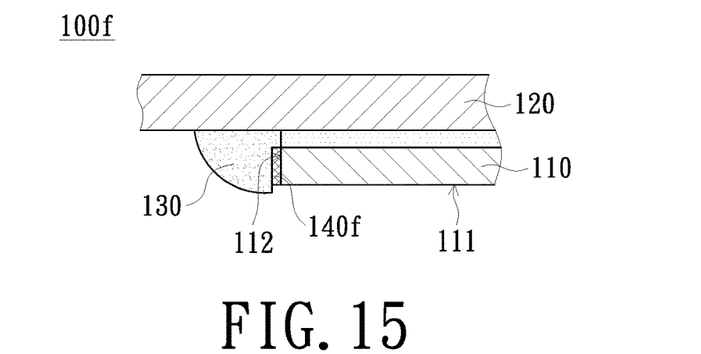
FIG. 15 is a partial cross-sectional schematic diagram of a display device according to another embodiment of the present disclosure.

FIG. 15 is a partial cross-sectional schematic diagram of a display device according to another embodiment of the present disclosure. The structure and advantages of the display device 100f in this embodiment are similar to those of the embodiment in FIG. 2, and only the differences are described below. With reference to FIG. 15, the limiting adhesive tape 140f is disposed on the first side surface 112, and the adhesive body 130 extends from the first side surface 112 to the second substrate 120. In detail, wires (not shown in the figure) may be disposed on a part of the first side surface 112, and the part of the first side surface 112 may be covered by the adhesive body 130 to protect the wires, but a function of the adhesive body 130 is not limited by the present disclosure. In this embodiment, before the process of removing the limiting adhesive tape T (shown in FIG. 5) is performed, the limiting adhesive tape T may be fixed to the first side surface 112 of the first substrate 110 and the second substrate 120, and a part of the limiting adhesive tape T located on the first side surface 112 may be covered by the adhesive body 130. Further, after the process of removing the limiting adhesive tape T is performed, the limiting adhesive tape 140f shown in FIG. 15 is formed. In an embodiment, before the process of removing the limiting adhesive tape T (shown in FIG. 5) is performed, the limiting adhesive tape T may be fixed to the first side surface 112 and the first surface 111; on the other hand, the adhesive body 130 may extend from the second substrate 120 to the first side surface 112, and the limiting adhesive tape T located on the first side surface 112 may be covered by the adhesive body 130. Therefore, the limiting adhesive tape 140f shown in FIG. 15 still remains on the first side surface 112 after the process of removing the limiting adhesive tape T is performed. In another embodiment, the adhesive body 130 may not extend to the first surface 111 of the first substrate 110, and the coverage of the adhesive body 130 is not limited by the present disclosure.

Figure 16:
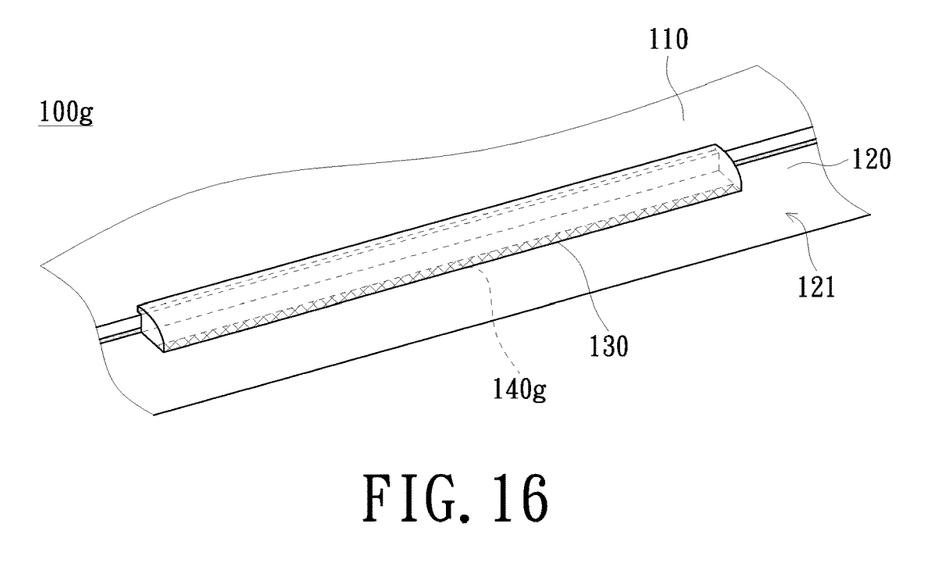
FIG. 16 is a partial 3D schematic diagram of a display device according to another embodiment of the present disclosure.
Figure 17:
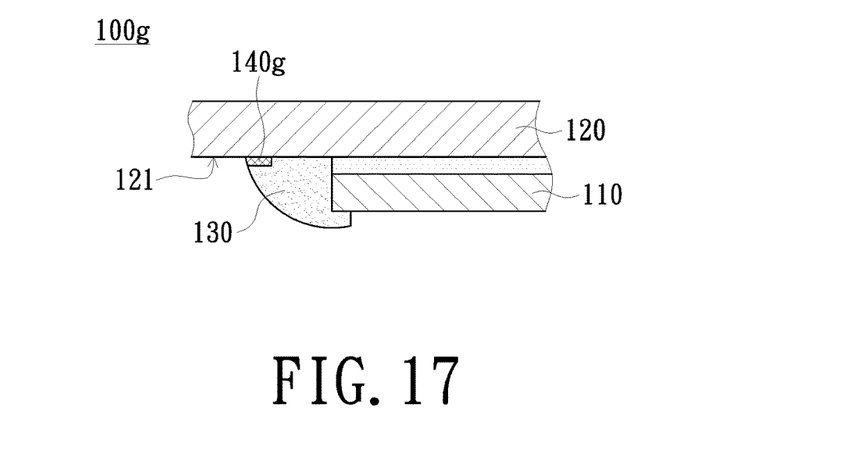
FIG. 17 is a partial cross-sectional schematic diagram of the display device in FIG. 16.

FIG. 16 is a partial 3D schematic diagram of a display device according to another embodiment of the present disclosure. FIG. 17 is a partial cross-sectional schematic diagram of the display device in FIG. 16. The structure and advantages of the display device 100g in this embodiment are similar to those of the embodiment in FIG. 2, and only the differences are described below. With reference to FIG. 16 and FIG. 17, the second substrate 120 has, for example, a second surface 121, and the second surface 121 faces the first substrate 110. The limiting adhesive tape 140g is disposed on the second surface 121, and the adhesive body 130 extends from the second surface 121 to the first substrate 110. Furthermore, before the process of removing the limiting adhesive tape T (shown in FIG. 4) is performed, the limiting adhesive tape T may be fixed to the first substrate 110 and the second substrate 120, and a part of the limiting adhesive tape T located on the second surface 121 is covered by the adhesive body 130. In this way, after the process of removing the limiting adhesive tape T is performed, the limiting adhesive tape 140g shown in FIG. 16 and FIG. 17 can be formed by the limiting adhesive tape T located on the second surface 121.

Figure 18:
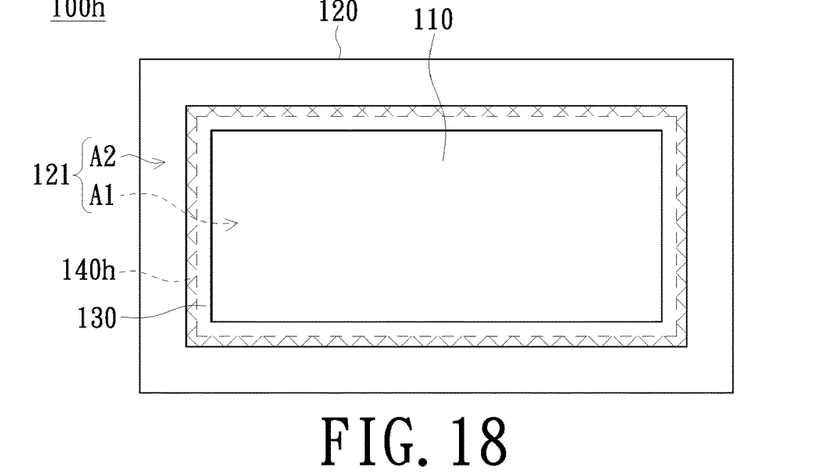
FIG. 18 is a schematic top diagram of a display device according to another embodiment of the present disclosure.

FIG. 18 is a schematic top diagram of a display device according to another embodiment of the present disclosure. The structure and advantages of the display device 100h in this embodiment are similar to those of the embodiment in FIG. 16, and only the differences are described below. With reference to FIG. 18, the second surface 121 of the second substrate 120 has, for example, a central area A1 and a peripheral area A2. The central area A1 is opposite to the first substrate 110, and the central area A1 is surrounded by the peripheral area A2. The limiting adhesive tape 140h is disposed in the peripheral area A2. Specifically, the adhesive body 130 is disposed on the second surface 121 along the edge of the first substrate 110, and the first substrate 110 is surrounded by the adhesive body 130. Before the process of removing the limiting adhesive tape is performed, a part of the limiting adhesive tape on the second surface 121 is covered by the adhesive body 130, so the part of the limiting adhesive tape still remains on the second surface 121 after the process of removing the limiting adhesive tape is performed, and the limiting adhesive tape 140h shown in FIG. 18 is formed by the remained limiting adhesive tape. Incidentally, the limiting adhesive tape 140h in this embodiment surrounds the first substrate 110 in an integral structure, but the limiting adhesive tape 140h may surround the first substrate 110 in a segmented structure in one embodiment. In the same way, the adhesive body 130 may surround the first substrate 110 in an integral structure or a segmented structure, but the present disclosure is not limited thereto.

Figure 19:
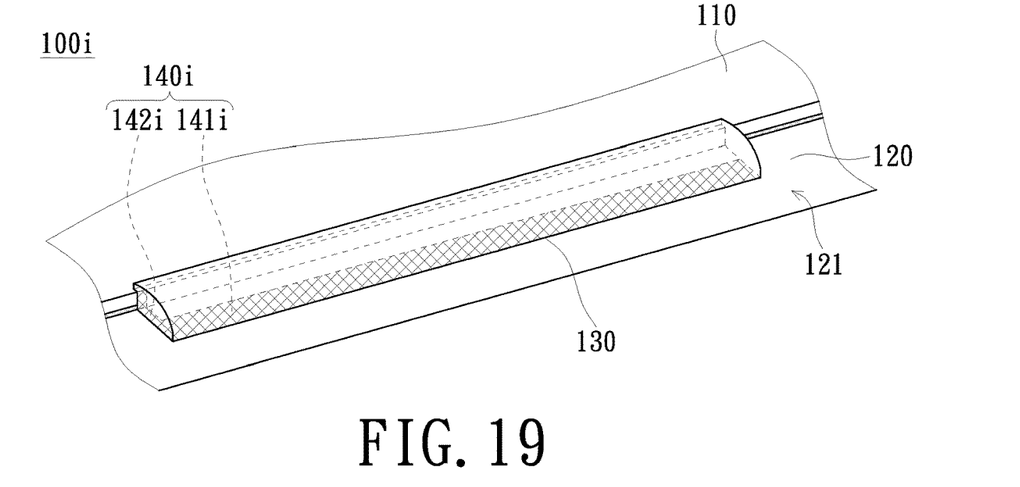
FIG. 19 is a partial 3D schematic diagram of a display device according to another embodiment of the present disclosure.
Figure 20:
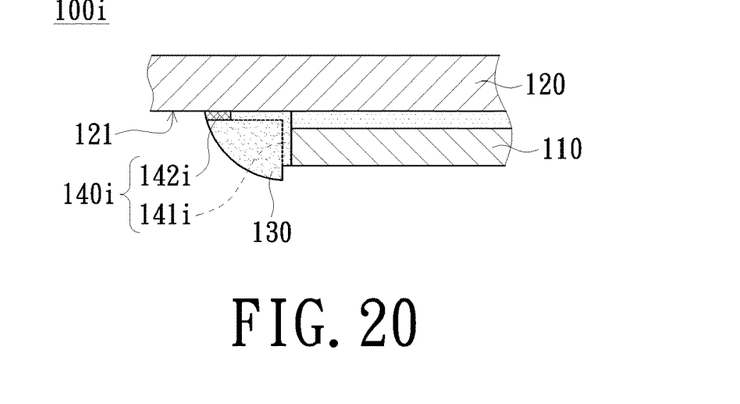
FIG. 20 is a partial cross-sectional schematic diagram of the display device in FIG. 19.

FIG. 19 is a partial 3D schematic diagram of a display device according to another embodiment of the present disclosure. FIG. 20 is a partial cross-sectional schematic diagram of the display device in FIG. 19. The structure and advantages of the display device 100i in this embodiment are similar to those of the embodiment in FIG. 16, and only the differences are described below. With reference to FIG. 19 and FIG. 20, the limiting adhesive tape 140i may have a main body portion 141i and a positioning portion 142i. The main body portion 141i is located on the second surface 121 of the second substrate 120. The positioning portion 142i is connected to the main body portion 141*i* and extends to the first substrate 110. Similarly, the disposing region of the adhesive body 130 can be more accurately controlled by the positioning portion 142*i*, and the detailed description is omitted here. In addition, the process of forming the positioning portion 142*i* is described in the foregoing description, so no redundant detail is to be given herein.

Figure 21:
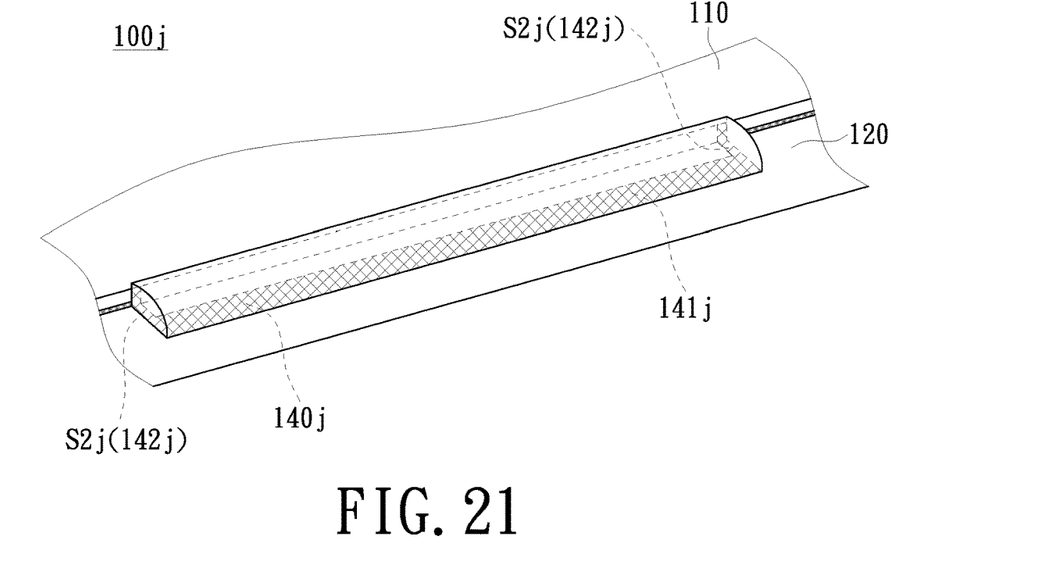
FIG. 21 is a partial schematic perspective diagram of a display device according to another embodiment of the present disclosure.

FIG. 21 is a partial schematic perspective diagram of a display device according to another embodiment of the present disclosure. The structure and advantages of the display device 100*j* in this embodiment are similar to those of the embodiment in FIG. 19, and only the differences are described below. With reference to FIG. 21, the positioning portion 142*j* includes, for example, a first segment S1*j* and a second segment S2*j*. The first segment S1*j* and the second segment S2*j* are connected to the two opposite sides of the main body portion 141*j* respectively and extend to the first substrate 110. In this way, the disposing region of the adhesive body 130 can be controlled more accurately by the limiting adhesive tape 140*j*. Similarly, the process of forming the first segment S1*j* and the second segment S2*j* is described in the foregoing description, so no redundant detail is to be given herein. In the same way, the specific position of the main body portion 141*j* is not limited by the present disclosure.

Figure 22:
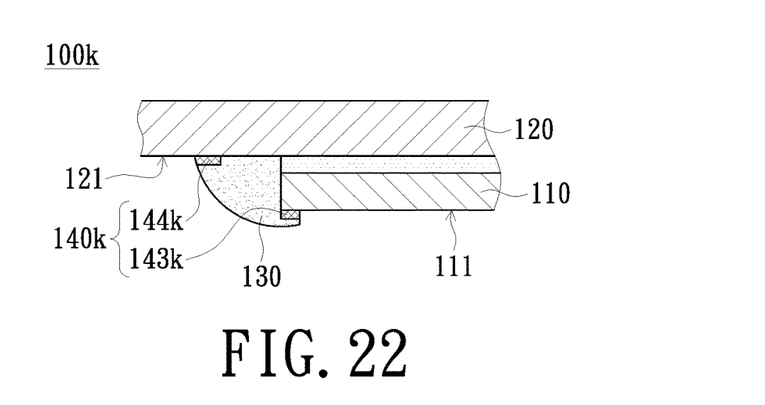
FIG. 22 is a partial cross-sectional schematic diagram of a display device according to another embodiment of the present disclosure.

FIG. 22 is a partial cross-sectional schematic diagram of a display device according to another embodiment of the present disclosure. The structure and advantages of the display device 100*k* in this embodiment are similar to those of the embodiment in FIG. 2, and only the differences are described below. With reference to FIG. 22, the limiting adhesive tape 140*k* may have a first part 143*k* and a second part 144*k*. The first part 143*k* is disposed on the first surface 111 of the first substrate 110, and the second part 144*k* is disposed on the second surface 121 of the second substrate 120. The adhesive body 130 extends from the first surface 111 to the second surface 121. For example, before the process of removing the limiting adhesive tape T (shown in FIG. 4) is performed, the limiting adhesive tape T may extend from the first surface 111 to the second surface 121, and a part of the limiting adhesive tape T located on the first surface 111 and the second surface 121 is covered by the adhesive body 130. In this way, the part of the limiting adhesive tape T still remains on the first surface 111 and the second surface 121 after the process of removing the limiting adhesive tape T is performed, and the limiting adhesive tape 140*k* as shown in FIG. 22 is formed by the remained limiting adhesive tape T. However, a forming process of forming the limiting adhesive tape 140*k* is not limited by the present disclosure.

Figure 23:
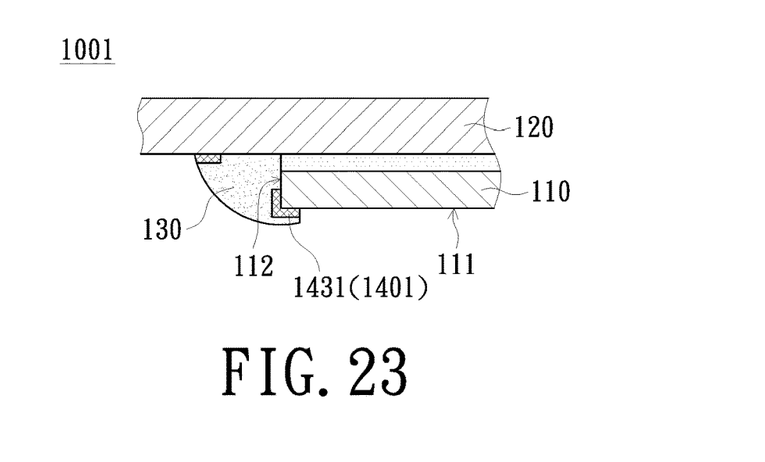
FIG. 23 is a partial cross-sectional schematic diagram of a display device according to another embodiment of the present disclosure.

FIG. 23 is a partial cross-sectional schematic diagram of a display device according to another embodiment of the present disclosure. The structure and advantages of the display device 100*l* in this embodiment are similar to those of the embodiment in FIG. 22, and only the differences are described below. With reference to FIG. 23, the first part 143*l* may extend from the first surface 111 to the first side surface 112, and the adhesive body 130 may extend from the first surface 111 and the first side surface 112 to the second surface 121. Furthermore, before the process of removing the limiting adhesive tape is performed, a part of the limiting adhesive tape extends from the first surface 111 to the first side surface 112, and the part of the limiting adhesive tape is covered by the adhesive body 130. Therefore, the part of the limiting adhesive tape still remains on the first surface 111 and the first side surface 112 after the process of removing the limiting adhesive tape is performed, and the limiting adhesive tape 1401 shown in FIG. 23 is formed by the remained limiting adhesive tape. However, a process of forming the limiting adhesive tape 1401 is not limited by the present disclosure.

In summary, the process of assembling the display device of the present disclosure includes: disposing the limiting adhesive tape at the preset position; coating the adhesive body, and then removing the limiting adhesive tape, at the same time, the adhesive body attached to the limiting adhesive tape is removed together with the limiting adhesive tape. In this way, a part of the limiting adhesive tape still remains on the first substrate and/or the second substrate, and the remained limiting adhesive tape is covered by the adhesive body. Based on the description above, the adhesive body of the display device of the present disclosure is only coated with the preset region which has a moderate area, so that no adhesive body overflows to affect a disposing space of other components.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A display device, comprising:
a first substrate;
a second substrate, disposed to be opposite to the first substrate;
an adhesive body, connected to the first substrate and the second substrate; and
a limiting adhesive tape, disposed on the first substrate and/or the second substrate, and the limiting adhesive tape being covered by the adhesive body;
wherein the first substrate has a first surface, the first surface faces away from the second substrate, and the limiting adhesive tape is disposed on the first surface;
wherein the first substrate further has a first side surface, the first side surface is connected to the first surface, and the adhesive body extends to the first side surface.

2. The display device according to claim 1, wherein the limiting adhesive tape extends from the first surface to the first side surface, and the adhesive body extends from the first surface to the first side surface and the second substrate.

3. The display device according to claim 1, wherein the limiting adhesive tape has a main body portion and a positioning portion, the main body portion is located on the first surface, and the positioning portion is connected to the main body portion and extends to the first side surface.

4. The display device according to claim 3, wherein the positioning portion further extends to the second substrate.

5. The display device according to claim 3, wherein the positioning portion comprises a first segment and a second segment, the main body portion extends along an edge of the first surface, and the first segment and the second segment are connected to two opposite sides of the main body portion respectively and extend to the first side surface.

6. The display device according to claim 5, wherein the first segment and/or the second segment further extend to the second substrate.

7. The display device according to claim 1, wherein the first substrate has a first surface and a first side surface, the first surface faces away from the second substrate, the limiting adhesive tape is disposed on the first side surface, and the adhesive body extends from the first side surface to the second substrate.

8. The display device according to claim 1, wherein the second substrate has a second surface, the second surface faces the first substrate, the limiting adhesive tape is disposed on the second surface, and the adhesive body extends from the second surface to the first substrate.

9. The display device according to claim 8, wherein the second surface has a central area and a peripheral area, the central area is opposite to the first substrate, the central area is surrounded by the peripheral area, and the limiting adhesive tape is disposed in the peripheral area.

10. The display device according to claim 8, wherein the limiting adhesive tape has a main body portion and a positioning portion, the main body portion is located on the second surface, and the positioning portion is connected to the main body portion and extends to the first substrate.

11. The display device according to claim 10, wherein the positioning portion comprises a first segment and a second segment, and the first segment and the second segment are connected to two opposite sides of the main body portion respectively and extend to the first substrate.

12. The display device according to claim 1, wherein the limiting adhesive tape has a first part and a second part, the first substrate has a first surface, the first surface faces away from the second substrate, the second substrate has a second surface, the second surface faces the first substrate, the first part is disposed on the first surface, the second part is disposed on the second surface, and the adhesive body extends from the first surface to the second surface.

13. The display device according to claim 12, wherein the first part extends from the first surface to the first side surface, and the adhesive body extends from the first surface and the first side surface to the second surface.

14. The display device according to claim 1, further comprising an adhesive layer, wherein the adhesive layer is sandwiched between the first substrate and the second substrate, and the adhesive body extends from an edge of the first substrate to the second substrate.

\* \* \* \* \*